United States Patent Office 3,843,522
Patented Oct. 22, 1974

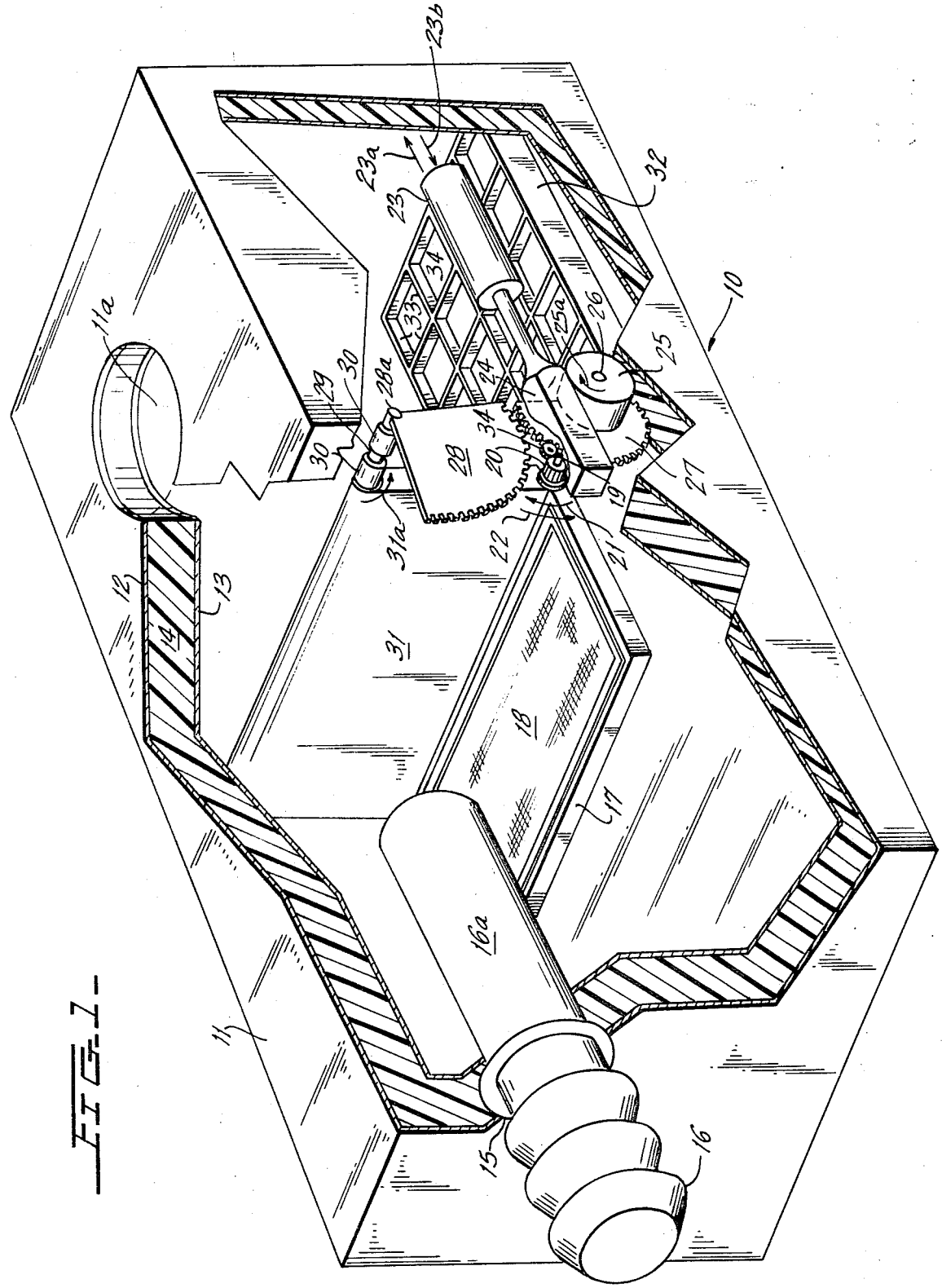

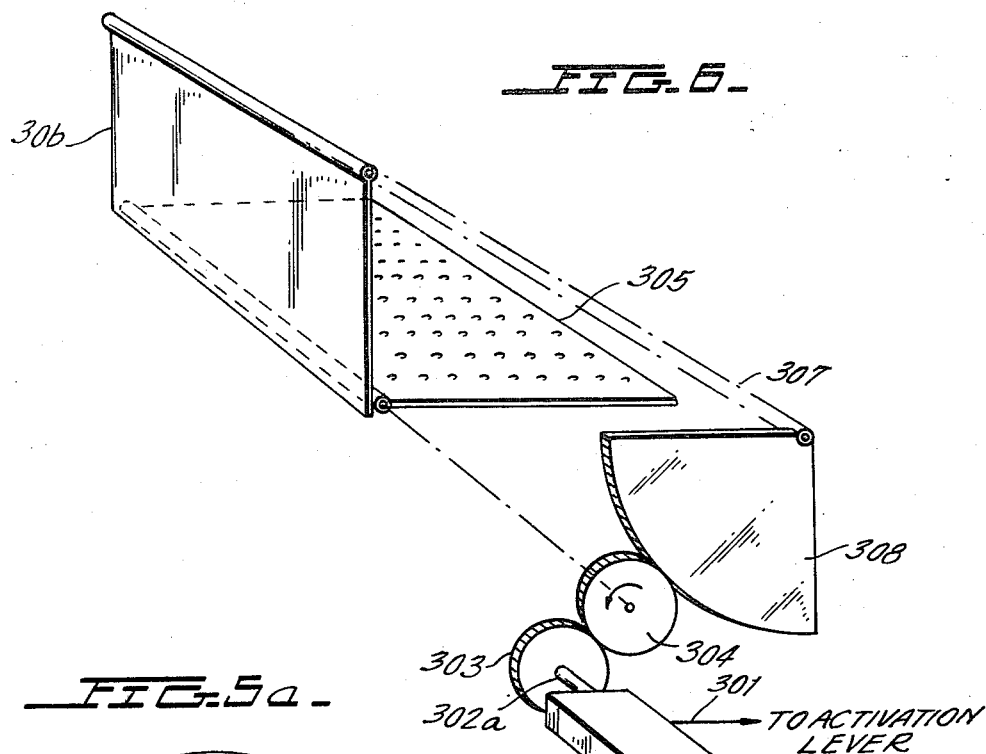
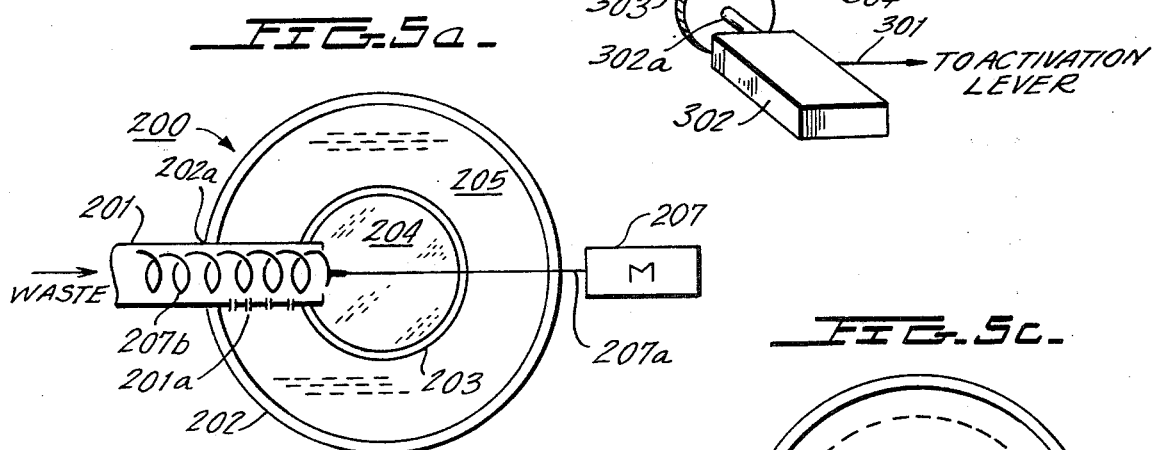
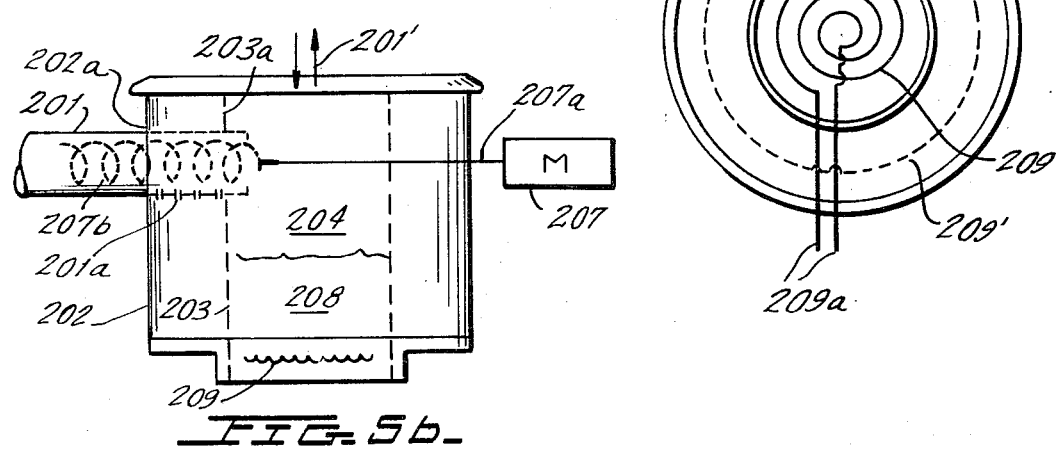

3,843,522
UNIVERSAL WASTE DISPOSAL SYSTEM
Gerald J. Harvey, 81 Urban Ave., Westbury, N.Y. 11590, and Richard D. Angelari, 334 W. 71st St., New York, N.Y. 10023
Filed June 9, 1972, Ser. No. 261,339
Int. Cl. C02b 1/02; F23g 5/00
U.S. Cl. 210—179                                      1 Claim

ABSTRACT OF THE DISCLOSURE

A system for the disposal of waste material in which both solid and liquid waste material may be accommodated. The composite waste material enters into the disposal system and is initially separated whereby liquid waste remains in the entry chamber while solid matter is carried from the entry chamber receiving composite waste to an adjacent chamber containing a molten bath for combusting fecal matter as well as other solids. The material of the molten bath is of an elevated temperature sufficient to completely combust the solid material while the entry chamber is maintained at a lower temperature adapted to evaporate liquid waste material. The molten bath is adapted to store energy sufficient to incinerate solid matter for a time duration adapted to require only intermittent means for heating the molten bath. The system is especially adapted for use in mobile applications such as, for example, on marine and aircraft equipment and affixed in mobile home applications as well as homes, apartments and industrial buildings. Both chambers may be provided with molten baths, if desired.

---

The present invention relates to waste disposal systems and more particularly to a novel two-chamber incineration system for accommodating both liquid and solid waste matter and a molten bath for completely combusting solid waste matter.

BACKGROUND OF THE INVENTION

Waste disposal systems find widespread use in both industrial and non-industrial applications which require that waste material be disposed of in the most efficient and non-polluting manner. Present day incerators which employ auxiliary fuel sources are typically provided with continuously operating fuel burners which serve to heat the incinerator to dehydrate the liquids in waste matter and incinerate or combust solid waste matter. In most instances, food wastes dehydrate slowly and the process may even require days before dehydration is completed. As a result, incinerators of this type cannot economically burn an appreciable quantity of wet refuse and typically required from two to eight hours for combustion of even dry material.

BRIEF DESCRIPTION OF THE INVENTION AND OBJECTS

The present invention is characterized by providing a novel universal waste disposal system adaptable for use in a wide variety of applications and which is characterized by providing means for separating liquid from solid waste, completely combusting solid waste matter in a molten bath, preferably of a metal material, and evaporating or alternatively recirculating the liquid waste matter.

The present invention, in one preferred embodiment, comprises a fully thermally insulated housing divided into first and second chambers. A first or entry chamber is provided with inlet means for receiving waste matter which typically may be comprised of both solid and liquid waste material. The waste matter enters through conduit means which is capable of depositing liquid matter into the first chamber and transferring solid matter into the second chamber containing a molten bath. In one preferred embodiment, the composite waste material is dropped upon a pivotally mounted perforated member which permits the passage of liquid waste material therethrough to remain in the entry chamber. The perforated member is rotated through an angle, simultaneously with the rotation of a pivotally mounted barrier wall, which permits the perforated member to deposit the solid waste matter upon the molten bath. The perforated member and barrier wall are then returned to their initial positions to retain the division between the two chambers. The molten bath which may, for example, be a pool of molten lead, completely consumes the solid waste matter. Outlet means are provided for exiting fumes and for gases generated as a result of the combustion operation. The first chamber is maintained at a much reduced temperature level and is adapted to evaporate the liquid waste matter.

In another preferred embodiment the pivotally mounted perforated member and barrier wall are replaced by a conduit which is coupled to the inlet of the housing which receives composite refuse and thereby moves the solid waste matter through the entry chamber and into the second chamber. A worm screw is mounted within the conduit and is rendered operative, preferably by motor driven means, when refuse is deposited in the system. The lower portion of the conduit which extends through the first chamber is preferably perforated to permit the passage of liquid waste matter therethrough while the worm screw drive advances the solid waste material through the conduit and into the second chamber where it is deposited upon a pool of molten material.

The pool molten material may be heated by electrical heating coils, a fuel burner system or any other suitable heating device. The entry chamber may be heated by convection wherein heat generated in the chamber containing the molten bath is caused to heat the entry chamber or alternatively by separate electrical heating coils or fuel burners which may be provided with suitable temperature controls such as thermocouples and the like.

If desired, the entry chamber utilized for receiving liquid waste matter may be attached to a recirculating system for permitting repeated use of the liquid.

The waste disposal system of the present invention is extremely advantageous for use in mobile facilities such as marine craft and may be utilized with present day marine craft sanitation systems. The inlet means of the waste disposal system may be directly coupled to the marine head through a suitable conduit for receiving the composite waste material. The molten bath may be heated at dockside and, for trips of short duration, will retain a sufficient amount of heat to combust the solid waste matter for the duration of the trip. For trips of longer periods of time the electrical system of the marine craft may be employed to maintain the heat of the molten bath at a sufficient level to assure substantially complete combustion. The system of the present invention requires no service or maintenance for a full season nor does it require the addition of any chemicals or other solutions. No shipboard power is required in the majority of applications which also further eliminates the need for any liquid petroleum gas or any fuel whatsoever. The system eliminates the need for overboard discharge of either treated or untreated sewage and the substantially complete combustion results in a very small amount of ash residue which need be removed on the average of once per year thus significantly reducing the amount of servicing and maintenance required for the equipment. The molten bath employed in the solids disposal chamber is preferably lead although other material having the characteristic of being in the molten state at desired temperature levels may be employed. In one preferred embodiment the high temperature chamber containing the molten bath is maintained at the temperature of the order of 900° F. while the low temperature (i.e. entry) chamber is maintained at a temperature level of the order of 260° F. The high temperature chamber combusts fecal material and other solids normally encountered in marine toilets (such as, for example, paper and cotton) while the low temperature chamber evaporates liquids (urine and flush water, for example). The capability of the molten bath to retain sufficient heat for combustion eliminates the need for shipboard powered in most applications. For trips of up to two days duration (and possibly more, depending upon the number of flushings and size of the unit) processing of waste matter can be accomplished at any docking facility having conventional A.C. power. For longer trips and where dockside utility power is not available, the required power may be supplied by the boat's electrical system. The systems may be adapted for such applications to operate on either A.C. or D.C. power.

It is therefore one object of the present invention to provide a novel system for waste disposal having the capability of separating solid and liquid waste material and for disposing of liquid waste materials through evaporation and disposing of solid waste material through the employment of a molten bath and further providing means for automatically separating liquid waste material from solid waste material.

BRIEF DESCRIPTION OF THE FIGURES

The above as well as other objects of the present invention will become apparent when reading the accompanying description and drawings in which:

FIG. 1 is a perspective view of a universal waste disposal system designed in accordance with the principles of the present invention wherein portions thereof have been removed to display the operating components of interest.

FIGS. 5a, 5b and 5c are top elevational and bottom views showing still another alternative embodiment of the present invention.

FIG. 6 shows a perspective view of an alternative embodiment for the separation mechanism shown in FIG. 1.

DETAILED DESCRIPTION OF THE FIGURES

Figure 2:
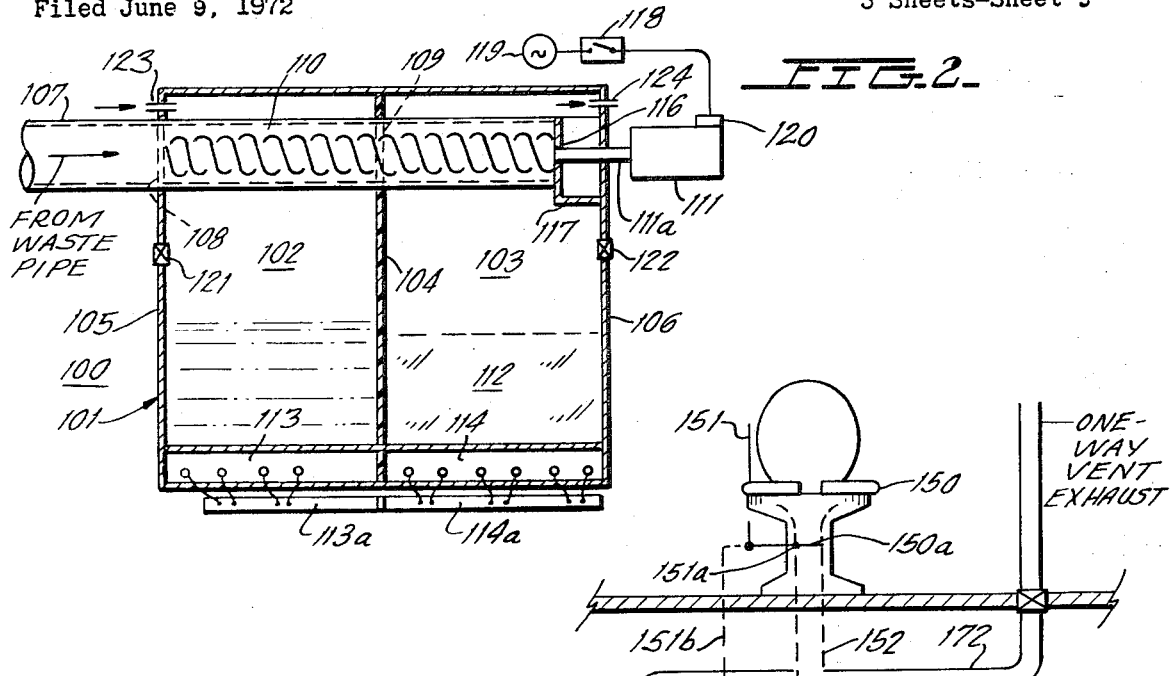
FIGS. 2, 3 and 4 show elevational views of other alternative embodiment of the present invention.

FIG. 1 shows one preferred embodiment 10 of the present invention which is comprised of a housing 11 having an outer metallic shell 12 separated from an inner metallic lining 13 by suitable insulation material 14. One end of housing 11 is provided with a suitable opening 15 for receiving one end 16a of a section of tubing 16 which functions as the conduit for conveying waste material to the system. The free end of tubing section 16a is positioned above a pivotally mounted screen member comprised of a frame 17 having a screen or other porous sheet or plate 18. The right-hand edge of the frame 17 is provided with a suitable opening for receiving a shaft 19 about which the frame pivots. A gear member 20 which is locked to frame 17 functions as the means for enabling pivotal movement of frame 17 about shaft 19 in the directions shown by arrows 21 and 22 respectively. The pivotal movement is provided for by means of a member 23 mounted for reciprocal movement in the direction shown by arrows 23a and 23b. Member 23 may be a linking member experiencing linear movement through the operation of a manually operable handle; may be an electrically operated device such as a plunger type relay; or may be a hydraulically or air operated device such as a piston, for imparting movement to a rack member 24 whose teeth engage the gear teeth of a pinion gear 25 mounted for rotation upon shaft 26. A second gear 27 secured to shaft 26 is mounted to rotate with the rotation of gear 25. This gear meshes with gear 28 which is rigidly secured to a shaft 29 by means of end cap 28a. Shaft 29 is free to rotate within bushings 30 secured to the interior wall of housing 11 and further has secured thereto a pivotally mounted barrier wall 31 which serves to divide housing 11 into first and second compartments in the solid line position as shown in FIG. 1. Gear 27 also meshes with a gear 34 which, in turn, meshes, with gear 20 to rotate frame 17.

The right-hand chamber defined by housing 11 and barrier plate 31 contains a tray shaped structure 32 having a plurality of the perpendicularly aligned vertical rib members 33 which function as baffle plates serving to divide the recessed surface 34 and tray 32 into a plurality of compartments. The tray is provided with means to be more fully described for heating the tray and its contents which may, for example, be lead, so as to bring the lead up to the molten state and preferably to a temperature of the order of 900° F. Housing 11 is provided with a suitable opening 11a for carrying off gaseous emissions and/or fumes which may be generated during combustion in a manner to be more fully described.

The operation of the system 10 of FIG. 1 is as follows:

Composite waste which is typically in the form of both liquid and solid waste material, passes through conduit 16 at its outlet opening so as to be deposited upon screen 18. Screen 18, being porous, permits liquid waste material to pass therethrough while supporting solid waste matter on its upper surface. The entry chamber on the left-hand side of pivotal barrier 31 is preferably maintained at an elevated temperature of the order of 260° F., which elevated temperature level may either be maintained through the escape of heat from the high temperature chamber or through the provision of suitable temperature controlled heating means (to be more fully described) provided in or beneath the floor of the lower temperature chamber. The temperature level maintained in the left-hand chamber is satisfactory for the elimination of liquid waste through evaporation.

By actuating member 23 to move in the direction of arrow 23a, rack 24 rotates gear 25 in the direction shown by arrows 25a about shaft 26. This causes gear 27 to rotate in the same direction. Gear 27 meshes with gear 28 to move barrier 31 from a vertical position to substantially a horizontal position (beneath the top of housing 11) by rotation of barrier plate 31 in the direction shown by arrow 31a. An intermediate gear 34 is positioned to mesh with gears 27 and 20 so as to rotate frame 17 and screen 18 in the direction shown by arrow 21 to cause the solid waste material on the surface of screen 18 to be deposited upon the tray assembly 32. The elevated temperature of the molten material (lead, for example) is sufficient to fully combust all of the solid waste matter and thereby consume the waste matter with only a small ash residue remaining. The amount of residue remaining is so small that the system of FIG. 1 requires cleaning at most once per year.

The movement of member 23 in the reverse direction as shown by arrow 23b causes barrier plate 31 to return to its vertical position and screen 18 and frame 17 to return to their horizontal position whereupon the barrier resumes its function of dividing the high and low temperature chambers from one another as evaporation of liquid waste and combustion of solid waste is completed.

FIG. 2 shows an alternative embodiment 100 of the present invention wherein the housing 101 is divided into first and second chambers 102 and 103 by intermediate barrier wall 104 arranged in spaced parallel fashion between the housing side walls 105 and 106. A conduit 107 delivers waste material through an opening 108 in side wall 101 and passes through chamber 102 and an opening 109 provided in intermediate barrier wall 104. The lower half of the portion of conduit 107 extending between side wall 105 and barrier wall 104 is perforated or otherwise porous so as to permit liquid waste material passing along conduit 107 to be deposited within the liquids disposal chamber 102. A worm screw conveyor member 110 is mounted within conduit 107 and is driven by the output shaft 111a of motor 111 for the purpose of conveying solid waste matter through conduit 107 and into the solids disposal container 103. The solid waste matter conveyed by the worm screw drive is dropped into the molten barrier temperature bath 112 where it is combusted and consumed. The liquids and solids disposal chambers 102 and 103 are provided with separate heating coil assemblies 113 and 114 which are operated by temperature control means 113a and 114a, respectively, to provide for incineration. The shaft 111a of motor 111 is provided with a seal 116 for journalling shaft 111a as well as for isolating motor 111 from the high temperature chamber 112 by means of insulating walls 117. The operation of motor 111 may be intermittent whereby a switch means 118 is actuated to couple power 119 to motor 111 through a timer 120 which may be operated over a predetermined time interval for conveying solid waste matter through conduit 107 and into the solids disposal chamber 103. Motor 111 may be adapted to be powered by either an A.C. source or a D.C. source to permit its use in either permanent or mobile type installations. The conduit 107 may be tilted to prevent liquid waste from being deposited in chamber 103.

Pressure operated valves 121 and 122 are provided in side walls 105 and 106, respectively, and function to permit air to enter into their respective chambers 102 and 103 during combustion operation when the ambient pressure exceeds the pressure in chambers 102 and 103. The pressure control valves however are of the one-way valve type so as to prevent inert gases or other emissions from escaping from chambers 102 and 103 through valves 121 and 122. Chambers 102 and 103 are provided with vents each having one-way valves as shown at 123 and 124, respectively, which are mounted within side walls 105 and 106. These vents may be coupled to suitable outlets such as flues and the like for carrying away gases, fumes and excess pressure from the solid and liquid waste disposal chambers 102 and 103.

Figure 3:
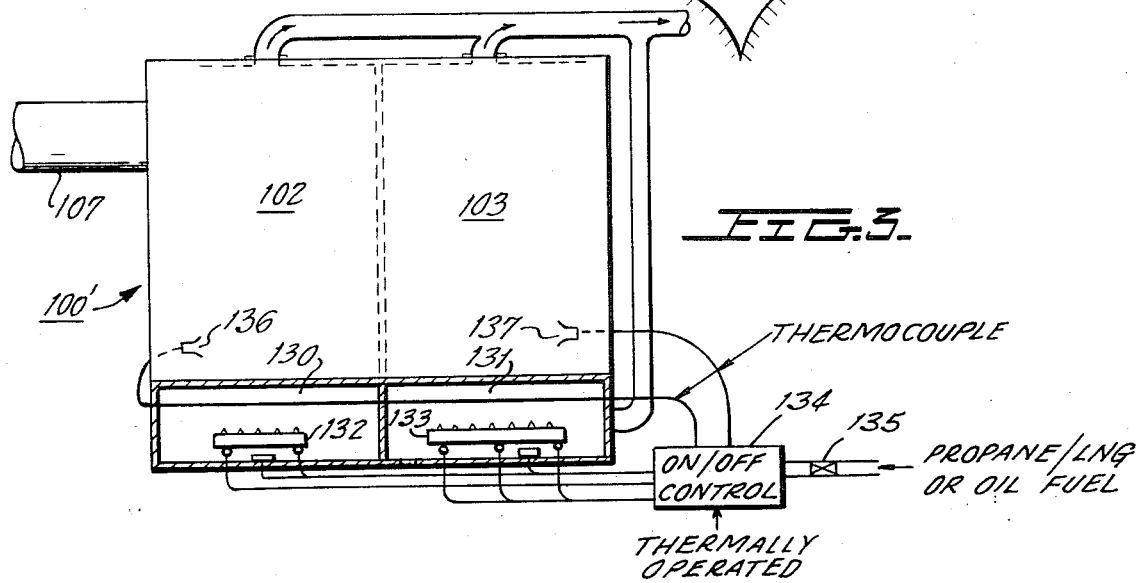

FIG. 3 shows an alternative arrangement 100' to that of FIG. 2 wherein the liquid and solid disposal chambers 102 and 103 are provided with floors 130 and 131 having burners 132 and 133 mounted therebeneath. On, Off and thermally operated control means 134 control the flow of fuel through conduit 135 to the burner assemblies 132 and 133 which fuel may be Propane, liquid, natural gas or oil. Thermocouple devices 136 and 137 are mounted within chambers 102 and 103, respectively, for monitoring the temperature level therein and are electrically connected to control means 134 for maintaining the desired temperature levels in chambers 102 and 103.

Figure 4:
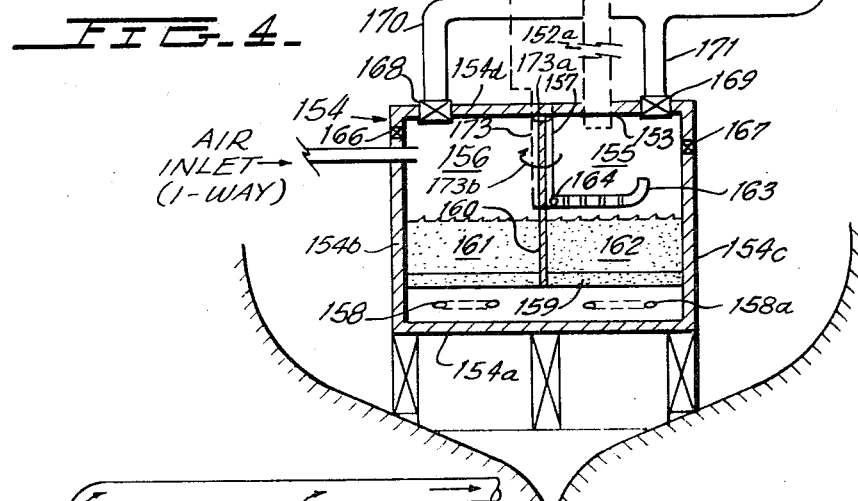

FIG. 4 shows the system of the present invention employed in marine craft in conjunction with a standard marine toilet 150. The flush control assembly 151 permits liquid and/or solid waste to pass from the bowl portion 150a by actuation of a rotatable plate 151a mechanically coupled to assembly 151, through waste conduit 152 which conveys the waste through an opening 153 provided in housing 154 which is divided into liquid and solid waste chambers 155 and 156 respectively by a pivotal barrier wall 157 and lower barrier 160. Housing 154 is provided with heating assemblies 158a and 158 positioned between the floor 154a of housing 154 and a horizontally aligned barrier 159 which, together with short vertical barrier 160 and side walls 154b and 154c, form first and second container portions each adapted to confine a molten bath 161 and 162 respectively, for each of the solid and liquid refuse chambers. The flush control assembly 151 functions to rotate perforated plate 163 about its pivot point 164 through a suitable mechanical linkage shown in simplified fashion as dotted line 151b, so as to deposit solid waste supported thereon into the solids disposal chamber 156. The perforations permit liquid waste matter to pass through perforated plate 163 and into molten bath 162. One-way air inlet valves 166 and 167, provided in side walls 154b and 154c, respectively, provide for the ingress of air when the pressure within chambers 156 and 155 is lower than ambient pressure.

One-way valves 168 and 169 are provided in the upper wall 154d of housing 154 to permit existing gases to pass from chambers 156 and 155, respectively, into conduits 170 and 171, respectively, where they are joined by a common conduit 172 for the exhaustion of gas and other fumes into the atmosphere.

The flush control assembly 151 is also mechanically linked through linkage member 151b to the pivotally mounted vertically aligned barrier plate 173 at pivot point 173a for rotating this plate in the direction shown by arrow 173b simultaneously with the rotation of perforated plate 163 to provide clearance for rotation of plate 163 in order that solid waste matter may be conveyed thereby into the solids disposal chamber 156. It can thus be seen from a consideration of FIG. 4 that the waste disposal system of the present invention may be advantageously employed in marine craft or for that matter in any mobile application.

The tray assembly of FIG. 1 provided with a plurality of mutually perpendicular separating members 33 serves to significantly reduce the amount of movement (or "sloshing") of the molten material which often occurs when the marine craft or other mobile facility is in motion.

The conduit 152 which carries composite waste material from the marine toilet 150 to the liquid disposal chamber 155 is shown broken at 152a to indicate that this conduit may be provided with an offset portion or other suitable mechanism or vent so as to prevent the heat generated within the liquids disposal chamber from being directly conveyed into the marine toilet.

Whereas the embodiments of FIGS. 1–4 show the liquid and solids disposal chambers as being arranged in side by side fashion, it should be understood that other arrangements are possible. For example, FIGS. 5a–5c show another preferred embodiment 200 of the present invention in which the liquids disposal chamber is shown surrounding the solids disposal chamber. As shown best in FIGS. 5a and 5c, a conduit 201 carries the composite waste from a waste collection source such as, for example, a marine toilet, to the waste disposal system which is comprised of annular shaped interior wall 203 which serves to define a solids disposal chamber 204 within wall 203 and an annular shaped hollow liquids disposal chamber 205 between the outer wall 202 and inner wall 203. These walls are each provided with openings 202a and 203a for conduit 201. The lower half of the portion of conduit 201 spanning walls 202 and 203 is perforated as shown in 201a to permit the passage of liquid refuse therethrough so as to drop into the annular shaped liquids disposal chamber 205. Conduit 201 is fitted with a worm screw drive 207b rotatable by shaft 207a of motor 207 so as to convey the solid waste into the solids disposal chamber 204 which is provided with a liquid pool 208 of molten material for combusting the solid waste material.

The bottom portion of the waste disposal system is fitted with a heating coil 209 which may be of a spiral configuration as shown best in FIG. 5c and having a pair of electrical leads 209a for coupling to a suitable power source and temperature control means so as to maintain the molten bath 208 at the requisite temperature. Sufficient heat may be caused to be conducted through inner wall 203 so as to maintain the liquids disposal chamber 205 at the desired elevated temperature. Alternatively, it should be understood that a separate heating coil may be provided beneath the floor of the liquids disposal chamber for separately and independently maintaining the temperature level therein. While not shown in detail it should be understood that suitable vents and pressure sensitive one-way valves may be provided for maintaining the gas pressure within the chambers at safe levels and for carrying away exiting gases and fumes in a manner shown and described hereinabove in connection with FIGS. 1–4.

Whereas the embodiment of FIGS. 5a–5c describes the solids disposal container as being surrounded by the liquids disposal container, it should be understood that a suitable refuse conduit 201' may be provided for directly depositing composite waste material into the centrally located chamber 204 which, in turn, may either be fitted with a conduit portion such as the conduit portion 201a having a worm screw drive 207 or may be fitted with a rotatable screen for conveying solid waste into the surrounding chamber 205 thus providing an arrangement in which the centrally located chamber 204 is employed for disposing of liquid waste with the annular shaped surrounding chamber 205 being employed to dispose of solid waste material.

The system, when employed in mobile facilities, may be suitably heated to an operating temperature which the liquid or molten bath is capable of maintaining for a sufficient time interval. For example, the system, when used in marine craft, may be heated by a suitable power source provided at dockside thereby eliminating the need for shipboard power for the majority of installations. For trips of up to two days duration (and possibly more, depending on the number of flushings and the size of the unit) the processing of the waste can be accomplished at any docking facility having conventional A.C. power. For longer trips, or where dockside utility power is not available, the required power may be supplied by the boat's electrical system.

In certain applications it may be desired to recirculate the liquid waste. In such instances, the liquid disposal chamber may be coupled through the suitable conduit means between the marine toilet and a separate chemically treated storage tank, in order to chemically treat the liquid waste and permit its continued use for flushing purposes.

Activation of the system for waste disposal may, as was described hereinabove, be under the control of the marine toilet operating crank. FIG. 6 shows one suitable arrangement in greater detail wherein the marine toilet actuation lever is coupled through a mechanical linkage 301 to a timed spring windlass 302 which functions after a predetermined time delay to operate its output shaft 302a for rotating gear 303 which meshes with gear 304 for rotating a perforated Teflon coated screen 305 pivotally mounted thereto to deposit solid waste matter into the solids disposal chamber in the same manner as was previously described. The windlass then automatically resets itself in readiness for the receipt of additional waste matter. The thermal barrier wall 306 is pivoted about a shaft 307, rotated by water gear 308, which meshes with gear 304 to temporarily remove the barrier wall and thereby permit screen 305 to deposit the solid waste matter into the solids disposal chamber.

It can be seen from the foregoing description that the present invention provides a novel composite solid and liquids waste disposal system which automatically separates liquid and solid waste matter, depositing it into its appropriate disposal chamber and which further serves to substantially completely combust at least solid waste matter through the use of a molten bath maintained at an elevated temperature level sufficient to fully combust the solid waste material and thereby reduce residue to a negligible amount. The system is adapted to store heat for prolonged intervals of time sufficient to adapt the system for use in mobile applications wherein no power is needed by the mobile facility in the majority of applications.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A portable waste disposal system comprising a housing; barrier means dividing said housing into first and second chambers;

said first chamber having an inlet for receiving waste matter;

first means in said first chamber positioned adjacent said inlet for depositing liquid waste matter in said first chamber, said first means being comprised of a porous member positioned beneath said inlet for retaining and supporting solid waste and permitting liquid waste to pass therethrough so as to be collected upon the floor of said first chamber;

said first means further comprising second means for conveying solid waste matter into said second chamber, said second means further including means for rotating said porous member towards said second chamber to deposit therein solid waste matter collected upon said porous member;

said second chamber having a pool of molten material;

baffle means positioned in and restraining the movement of said pool of molten material; and third means for heating said pool of molten material to an elevated temperature, said barrier means being comprised of a normally vertically aligned rotatable barrier plate coupled to said rotating means for moving said barrier plate to a horizontal position to provide sufficient clearance for said porous member to enable the same to transfer solid waste matter into said second chamber whereby said pool of molten material combusts solid waste matter deposited thereon.

References Cited

UNITED STATES PATENTS

| | | | |
|---|---|---|---|
| 3,714,914 | 2/1973 | Dorn | 110—8 R |
| 3,655,048 | 4/1972 | Pergola | 210—152 |
| 3,648,629 | 3/1972 | Southwick | 110—8 R |
| 3,592,151 | 7/1971 | Webber | 110—8 E |
| 3,235,087 | 2/1966 | Andrews et al. | 210—415 |
| 3,722,433 | 3/1973 | Kramer | 110—8 C |
| 3,700,565 | 10/1972 | Cornish et al. | 210—152 |
| 565,858 | 8/1896 | Fowler | 210—328 |

SAMIH N. ZAHARNA, Primary Examiner

B. CASTEL, Assistant Examiner

U.S. Cl. X.R.

210—181; 110—8 E